United States Patent [19]

Kenbeek et al.

[11] Patent Number: 5,314,634
[45] Date of Patent: May 24, 1994

[54] POLYESTER VISCOSITY INDEX IMPROVER

[75] Inventors: Dirk Kenbeek, Oudewater; Ramires R. Poulina, Gouda; Gijsbert Van der Waal, Bergambacht, all of Netherlands

[73] Assignee: Unilever Patent Holdings B.V., Rotterdam, Netherlands

[21] Appl. No.: 324,821

[22] Filed: Mar. 17, 1989

[30] Foreign Application Priority Data

Mar. 18, 1988 [EP] European Pat. Off. ........ 88200519.2

[51] Int. Cl.$^5$ ........................................... C10M 129/95
[52] U.S. Cl. .................................... 252/56 R; 560/199
[58] Field of Search ............................ 252/56 S, 56 R; 560/199

[56] References Cited

U.S. PATENT DOCUMENTS

| | | | |
|---|---|---|---|
| 3,086,044 | 4/1963 | Kerschner et al. | 560/199 |
| 3,194,791 | 7/1965 | Wilson et al. | 252/56 S |
| 3,202,701 | 8/1965 | Young et al. | 560/199 |
| 3,472,775 | 4/1969 | Boehringer | 252/57 |
| 4,689,429 | 8/1987 | Mertz et al. | 560/199 |

FOREIGN PATENT DOCUMENTS

| | | | |
|---|---|---|---|
| 0245665 | 11/1987 | European Pat. Off. . | |
| 855001 | 11/1960 | United Kingdom | 560/199 |
| 866589 | 4/1961 | United Kingdom | 560/199 |

*Primary Examiner*—Ellen M. McAvoy
*Attorney, Agent, or Firm*—Cushman, Darby & Cushman

[57] ABSTRACT

The invention provides a polyester based on dimeric fatty acid, a glycol without hydrogen atoms at an alpha carbon atom in which a C3–C12 monoalcohol chain-stopper is present and which contains approximately equivalent quantities of acid and alcohol groups. Preferably the dimer acid contains 36 carbon atoms and the monoalcohol is a branched chain C6–C10 alkanol. The invention also provides lubricant compositions comprising 30–2% (w.w.) of the polyester and 70–98% (w.w.) of an synthetic lubricant base.

7 Claims, No Drawings

POLYESTER VISCOSITY INDEX IMPROVER

The invention relates to certain polyester materials which are suitable for use as viscosity index improver in synthetic lubricant compositions and to synthetic lubricants containing the polyester. More in particular the invention relates to a polyester based on dimeric fatty acid, a glycol without hydrogen atoms at an alpha carbon atoms (hindered glycol) and the use thereof as a viscosity index improver in synthetic ester lubricants.

The viscosity of synthetic ester lubricants tends to thin out excessively at high temperatures. Since lubricant compositions are subjected to a wide range of temperatures it is desirable that the viscosity should only slightly vary with the temperature of the fluid. The resistance of the fluid to viscosity change is referred to as the viscosity index (VI) of the lubricant. The VI is classically determined by a method described by Dean and Davis, Ind. Eng. Chem. Vol 32,p.104,(1940). Conventionally nowadays the viscosities at 40° and 100° C. are determined and the VI value is then found by applying the tables according to ASTM-D-2270-74, which uses centistokes (cSt) for the kinematic viscosity. The greater the VI, the more ideal the lubricant is, that is the greater the resistance of the lubricant to thicken at low temperatures and to thin out at high temperatures. It is generally known to incorporate in lubricants thickeners which have a viscosity index improving effect.

Another important feature of lubricants is their behaviour at low temperatures, in particular pour point and cloud point are important parameters. The former indicates the temperature at which flow becomes impossible and is fully described in ASTM-D-97, whereas the cloud point i.e. the temperature at which turbidity becomes noticeable is described in ASTM-D-2500.

Clearly other parameters such as oxidation stability, corrosiveness towards metals and swell of sealing are also important features for practical applications.

It has been a problem to develop satisfactory lubricants, which perform well as to viscosity, low temperature properties, oxidation stability, corrosiveness etc.

It has been disclosed in U.S. Pat. No. 3,472,775 (Emery Industries) to manufacture synthetic ester lubricants containing a polyester viscosity improver, which has been prepared by esterification of long chain dicarboxylic acids, in particular polymerized unsaturated fatty acids and glycols, on particular hindered glycols such as neopentylglycol. After the acid had been prepared it contained excess acid, which was removed by treatment with a glycidyl ester. The acid value of these polyester viscosity improvers was well below 1.0 but the hydroxyl value was typically about 20. The viscosity index and low temperature properties of the disclosed lubricants were satisfactory but the former was not outstanding and needed further improvement, also it would be desirable to further improve the stability towards hydrolysis and oxidation and to improve corrosiveness towards metals, especially copper could be improved. According to the present invention at least one of these properties is considerably improved. Corrosiveness towards metals has been attributed especially to acidity and that is why much emphasis in the past has been placed on efficient removal of residual acidity of the polyester. For this reason deacidification methods for lubricant materials involving the addition and reaction with glycidyl esters have been developed. This method is disclosed inter alia in U.S. Pat. Nos. 3,472,775; 3,649,570 and 3,585,138. It has now been found that a polyester based on dimeric fatty acids, a glycol without hydrogen atoms at the alpha positions and a C3-C12 monoalcohol as a chainstopper, in approximately equivalent amounts of hydroxyl groups and carboxylic groups is a valuable novel stable compound. This polyester is an excellent viscosity improver in particular for certain lubricant bases having a viscosity of below 5.0, preferably below 4.0 cSt at 100° C. Furthermore this polyester proves to be extremely shear-stable when subjected to tests on the Kurt Orbahn testrig as described in DIN 51 382 and therefore leads to equally shear stable lubricant compositions and they are consequently much better than the conventional polymethacrylates. Preferably the lubricant base is a synthetic lubricant, more in particular a synthetic ester. The lubricant composition obtained by combining the low viscosity synthetic lubricant base and the polyester viscosity index improver according to the present invention (which has a high viscosity) typically shows a viscosity index of well above 200, even up to 300, combined with good low temperature properties, good oxidation stability, low metal corrosion etc have now been obtained. The lubricant base is preferably an ester (mixture) and the wide span blends of low viscosity lubricants and the viscosity index improver according to the present invention show a surprisingly high response to VI gain as shown below. In a preferred embodiment of the invention the polyester is based on a dimer acid containing 36 carbon atoms, which has been obtained by dimerization of C18 unsaturated fatty acids like oleic acid, linoleic acid, linolenic acid after removal of monomeric and trimeric fractions and hydrogenation to a hydrogen iodine value of below 10.

The glycol on which the polyester can be based is a glycol with 5 to 10 carbon atoms and no hydrogen atoms at the alpha carbon atoms (a hindered glycol). Preferred is neopentylglycol (2,2-dimethylpropanediol-1,3), but an ethyl homologue thereof can also be used. Also it possible to use a less hindered glycol such as 2,2,4-trimethylpentanediol-1,3 but then in conjunction with a glycol without hydrogen atoms on alpha carbon atoms.

The monoalcohol chain stopper is a C3-C15 monoalcohol, preferably aliphatic with a primary hydroxyl group. More preferably the alcohol has a branched chain and/or contains 6–13 carbon atoms. Preferred alcohols are pentyl-, heptyl- and octyl-alcohols, 2-ethylhexanol-1, 3,5,5-trimethylhexanol-1, isodecylalcohol, and isotridecylalcohol.

The polyester is prepared by heating and esterifying a reaction mixture of dimer acid, a hindered glycol and a monoalcohol in the required approximately equivalent quantities of carboxyl- and hydroxyl groups and to heat the mixture whilst allowing water of reaction to escape. The addition of an esterification catalyst such as p.toluenesulfonic acid, an organic metal compound such as tetrabutyltitanate or an organotin compound is advantageous for efficient operation as to reduction of reaction temperature and reaction time. When preparing the reaction mixture for the polyester it is recommendable to use 10 to 70 equivalent percent of monoalcohol and from 90 to 30 equivalent percent of hindered glycol per equivalent of dimer acid, also it is good practice to avoid that ingredients, in particular the monoalcohols, escape during the reaction period. The equivalent percentages chosen will normally lead to a polyester with a weight average molecular weight between 2 000 and 12 000, if the esterification is continued to an acid value below 1.0 and a hydroxyl value below 10, preferably below 5. To obtain polyesters with lower acid values it is useful to add and react with at least a stoechiometric amount of glycidyl ester. Optionally the catalyst is removed before using the ester obtained.

The invention also provides lubricant compositions which comprise 30-2% (w.w.) of a polyester as herein described before as a viscosity improver and 70 to 98% (w.w.) of a synthetic lubricant base together with conventional adjuncts, preferably the amount of polyester is between 5 and 20% (w.w.).

The synthetic lubricant base usually comprises a saturated organic compound containing from 6 to 30, preferably from 12 to 24 carbon atoms in the molecule. Esters, in particular mono- and di-esters are preferred. Examples are: 2-ethylhexyl ester of C8–C10 n.monocarboxylic acids, 2-ethylhexyl dodecanoate, propylene glycol dipelargonate, glycerol tri- n.heptanoate, trimethylolpropane (TMP) tripelargonate, pentaerythritol tetra-pelargonate, di-isodecyl-azelate, di isooctyl sebacate etc. Mixtures of individual esters can also be used with advantage. Fully ester based lubricant compositions are preferred because of their excellent performance properties.

It has been noted that in the case of combining lower (thin) ester lubricant bases with a polyester viscosity index improver according to the invention considerable and unexpected increases in viscosity index can be achieved so that VI's in the order of magnitude of above 200, often above 240 even up to 300 are obtainable. The total ester composition comprising the polyester viscosity improver and the ester lubricant base can conveniently prepared by mixing of the ingredients optionally at a temperature of up to 80° C.

Also it is possible to obtain such mixtures by stepwise esterification of the various alcohols and carboxylic acids. Conventional adjuncts in the lubricant compositions according to the present invention are: anti-oxidants, anti-corrosion additives, metal deactivators, quinizarin, tri-cresyl phosphate, which are usually present in an amount up to 5% of the total composition when taken together.

EXAMPLE 1

A polyester viscosity index improver was prepared by reacting in an autoclave a charge of approximately 3200 grams of a mixture consisting of the following compounds:

2.4 moles of dimer acid ("Pripol 1009", ex Unichema, Gouda, Netherlands containing 99% of C 36 dicarboxylic acid, hydrogen iodine value 5)
1.6 moles of neopentyl glycol
1.0 mole of 2-ethylhexanol-1

The esterification was carried out at 230° C. in a nitrogen atmosphere and under reflux of 2-ethylhexanol using 0.05% (w.w.) of the charge tetrabutyltitanate catalyst. After reacting for 2 hours at 230° C. another mole of 2-ethylhexanol was added and refluxing under vacuum took place until the acid value had dropped to a value below 1.0. Thereafter 2.6% (w.w.) of the glycidyl ester of synthetic C10 branched chain fatty acids) were added and subsequently vacuum was applied as to distill off excess 2-ethylhexanol and reducing the acid value to 0.06. The resulting polyester which had a hydroxyl value of 4 was calculated to have a weight average molecular weight of 2100. Viscosity index 181.

EXAMPLE 2

The polyester viscosity index improver was prepared according to the procedure of Example 1, however, the following starting materials were charged to the autoclave:

8.5 moles of dimer acid "Pripol 1009" as described above
8.5 moles of neopentyl glycol
1.0 moles of 2-ethylhexanol-1,
as a catalyst 0.05% (w.w.) of stannous oxalate was added. The polyester so produced had an acid value of 0.09, a hydroxyl value of 5 and the calculated weight average molecular weight was approximately 5900. The viscosity index could not be determined because of the high viscosity values (calculated value according to theory 271).

EXAMPLES 3 and 4

The polyester viscosity index improvers prepared according to Examples 1 and 2 were blended at 20° C. with an ester lubricant base consisting of the estermixture obtained by esterifying 2-ethylhexanol-1 with a mixture of n.C8 and n.C10 (60:40 molar ratio) monocarboxylic acids. The lubricant compositions containing lubricant base and polyester viscosity improver 1 and 2 in 86:14 (Ex 3) and 72:28% by weight (Ex 4) were tested as to their viscosity—and low temperature properties by methods indicated above. The results are tabulated below.

|       | Viscosity 100° C. (cSt) | Viscosity 40° C. (cSt) | Viscosity Index | Viscosity −40° C. (cSt) | Pour point below |
|-------|-------------------------|------------------------|-----------------|-------------------------|------------------|
| Ex. 3 | 4.78                    | 14.92                  | 284             | 820                     | −60° C.          |
| Ex. 4 | 4.64                    | 15.96                  | 236             | 1210                    | −60° C.          |

As is evident from the above data the lubricant compositions had a very high viscosity index combined with excellent pour points and good viscosities at −40° C.

EXAMPLES 5-50

The polyester viscosity index improver of Example 2 was mixed with several ester lubricant bases in different percentages and the viscosity indices were determined by the method indicated above. The results are tabulated below:

| Ester based on | visc. 100° C. | 2% | 5% | 10% | 15% | 20% |
|---|---|---|---|---|---|---|
| | VI as function of polyester percentage (polyester acc. to Ex. 2) | | | | | |
| 2 ethylhexyl alc. + C8-C10-mono acids (60:40 ww) | 1.30 | 209 | 221 | 280 | 278 | 281 |
| TMP + C7-mono acid | 3.44 | 166 | 177 | 191 | 197 | 197 |
| diprop.glycol + C9-mono acid | 3.66 | 161 | 189 | 220 | 230 | 225 |
| isodecylalc. + C9-mono acid | 1.70 | 174 | 205 | 249 | 262 | 260 |
| TMP + C9-mono acid | 4.60 | 168 | 172 | 181 | 183 | 199 |
| di-iso decyl azelate | 4.44 | 174 | 191 | 199 | 199 | 197 |
| 2-ethylhexanol + C7-mono acid | 1.07 | 436* | 276* | 267 | 299 | 303 |

-continued

| Ester based on | VI as function of polyester percentage (polyester acc. to Ex. 2) | | | | | |
|---|---|---|---|---|---|---|
| | visc. 100° C. | 2% | 5% | 10% | 15% | 20% |
| 2-ethylhexanol + C12-mono acid | 1.97 | 187 | 217 | 248 | 262 | 261 |
| glycerol + C9-mono acid | 3.72 | 154 | 177 | 193 | 193 | 196 |
| Comparison: pentaeryth. + C5, C7, C8, C10-mono acids (2:6:1:1 ww) | 5.12 | 153 | 175 | 177 | 181 | 186 |

*calculated values whereas the other data are measured values

We claim:

1. A polyester consisting essentially of:
   a dimeric fatty acid containing 36 carbon atoms obtained by dimerization of C18 unsaturated fatty acids, and
   a glycol without hydrogen atoms at an alpha carbon atom,
   wherein said polyester contains a C3–C12 monoalcohol chainstopper and said polyester contains approximately equivalent quantities of acid and alcohol groups.

2. A polyester as claimed in claim 1 wherein the dimer acid has a hydrogenation iodine value below 10.

3. A polyester as claimed in claim 1 characterized in that the glycol is neopentylglycol (2,2-dimethyl-propanediol-1,3).

4. A polyester as claimed in claim 1 characterized in that the monoalcohol is a branched chain C6–C10 alkanol.

5. A polyester according to claim 1, characterized in that the polyester has an acid value between 0 and 0.5 and a hydroxyl value between 0 and 10.

6. A polyester according to claim 1 characterized in that the weight average molecular weight of the polyester ranges between 2,000 and 12,000.

7. A polyester according to claim 1 characterized in the polyester comprises from 10 to 70 equivalent percent monoalcohol and from 90 to 30 equivalent percent of glycol per equivalent of dimer acid.

* * * * *